United States Patent [19]

Anthony et al.

[11] Patent Number: 5,006,185
[45] Date of Patent: Apr. 9, 1991

[54] PIPE INSULATION AND CORROSION PROTECTION SYSTEM

[75] Inventors: Donald R. Anthony, Plano; George C. Williamson, III, Wylie, both of Tex.

[73] Assignee: Atlantic Richfield Company, Los Angeles, Calif.

[21] Appl. No.: 139,232

[22] Filed: Dec. 29, 1987

[51] Int. Cl.⁵ .............................................. B31C 13/00
[52] U.S. Cl. ................................... 156/193; 156/250; 138/151; 285/47
[58] Field of Search ........................ 285/47, 53, 915; 156/173, 174, 184, 193, 250; 138/113, 147, 151

[56] References Cited

U.S. PATENT DOCUMENTS

| | | | |
|---|---|---|---|
| 1,499,774 | 7/1924 | Headson | 156/193 X |
| 2,051,076 | 8/1936 | Deakin | 156/143 X |
| 2,894,538 | 7/1959 | Wilson | 285/53 |
| 3,030,250 | 4/1962 | Losse | 285/53 X |
| 3,387,864 | 6/1966 | Walters | 285/915 X |
| 3,824,140 | 7/1974 | Hofmann | 156/193 X |
| 4,243,453 | 1/1981 | McClintock | 138/151 X |
| 4,327,778 | 5/1982 | Williams | 285/47 X |
| 4,605,043 | 8/1986 | Grenier | 138/151 X |
| 4,713,271 | 12/1987 | Searl et al. | 285/47 X |

FOREIGN PATENT DOCUMENTS 180282  5/1922  United Kingdom ............... 156/193

*Primary Examiner*—Dave W. Arola

[57] ABSTRACT

An insulation and corrosion protection system for a pipe includes a pair of elongated and cross sectionally semi-cylindrical segments of insulating material, and associated method of manufacture and installation. Each section of the insulating segments is made by wrapping a mandrel with an inner sleeve material, applying an elastomeric inner jacket, a layer of insulating material and outer jacket. A hinge is installed beneath the outer jacket for pivotally connecting the two semi-cylindrical portions of the structure. The insulating segment is completely encapsulated within an elastomeric jacket material to seal the insulating member. Before the insulating segment is installed around a pipe an elastomeric sealing material is applied to exposed edges of mating surfaces of the semi-cylindrical portions of the insulation segments. Then the semi-cylindrical portions are positioned around a pipe enclosing it. Bands are secured around the exterior of the insulation segment to secure its separate portions together for curing of the adhesive material. When the material has cured, the bands are removed and any exposed portions of the seam are then covered with an elastomeric sealing material. Adjacent ends of successive insulating segments covering a pipe system are joined with an adhesive and sealed to provide for continuous sealing of the pipe for isolation from the environment surround the pipe.

4 Claims, 1 Drawing Sheet

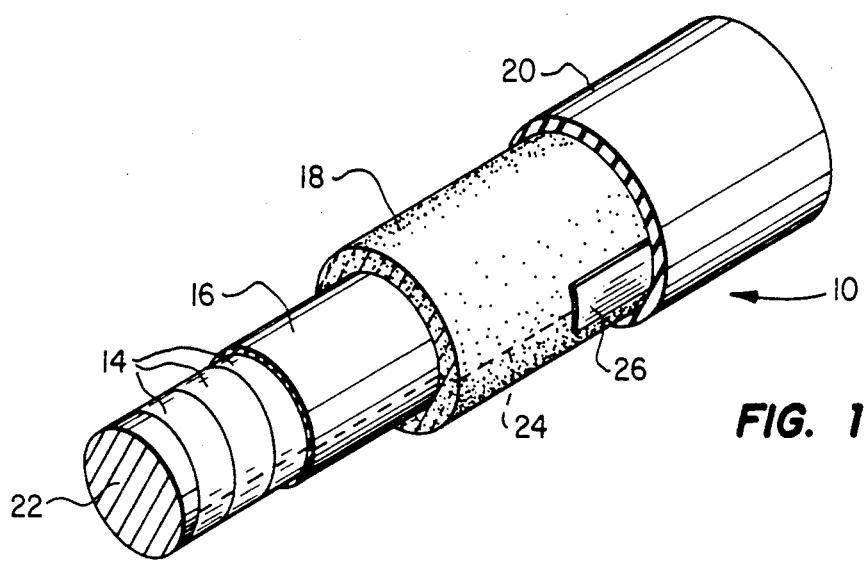
FIG. 1
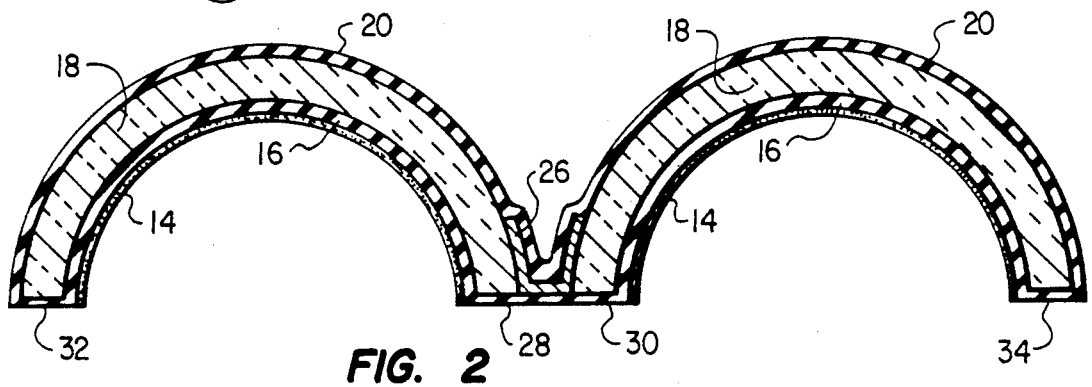
FIG. 2
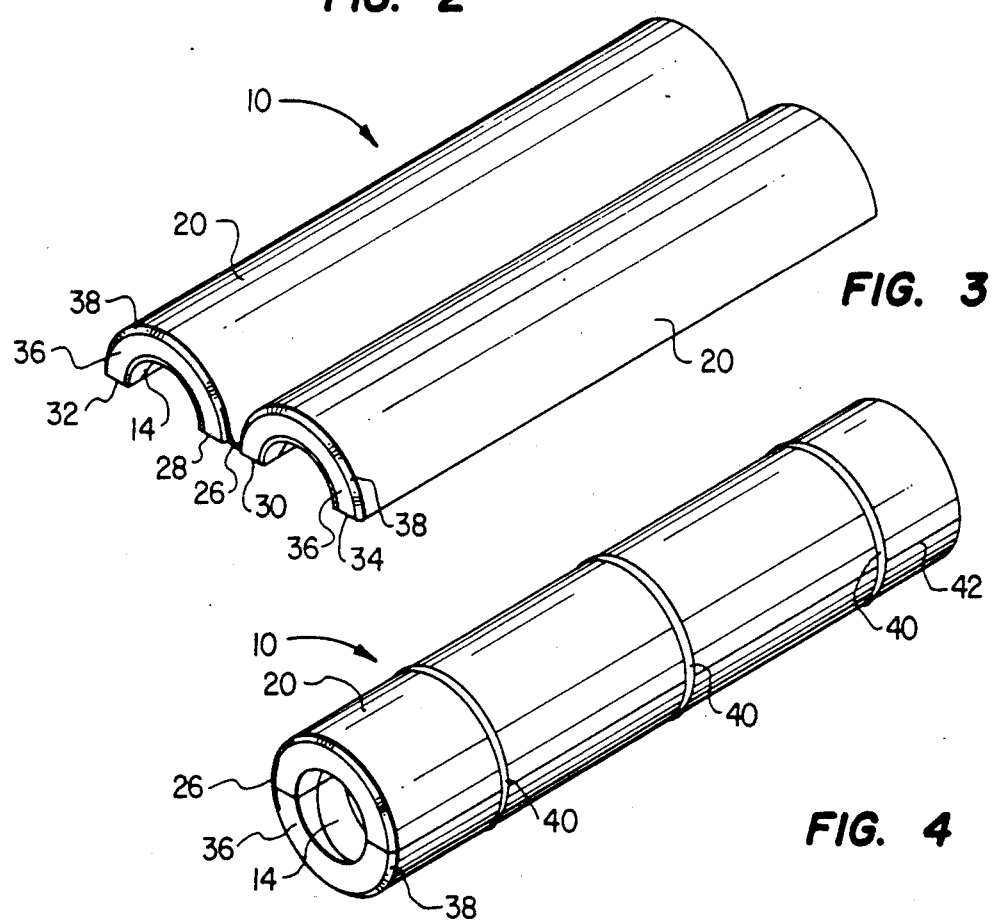
FIG. 3
FIG. 4

PIPE INSULATION AND CORROSION PROTECTION SYSTEM

BACKGROUND OF THE INVENTION

This invention is related to the protection of outdoor piping systems. In particular, the invention is related to the manufacture and installation of an insulation system that provides corrosion protection for an outdoor pipe that is superior to the prior art pipe insulation and protection systems.

In the prior art, such outdoor pipe insulation systems have a layer of insulating material such as fiberglass batting or other insulating material wrapped around the pipe that is then covered with a tubular metal shield having at least one longitudinal seam. The seam may be sealed and joints made between ends of adjacent sections of the covering. These joints may be overlapped portions of the covering or done with a connecting fixture. One problem with this existing type of prior art insulating system is that with the passing of time the metal shield deteriorates and water is allowed to seep into the insulation. This moisture causes a degrading of the insulation's thermal insulating properties and also promotes corrosion because of the entrained moisture contained within the enclosed structure. As a result, a pipe enclosed in such an insulating system structure may corrode and deteriorate more rapidly than if it is exposed to outdoor weather conditions.

SUMMARY OF THE INVENTION

An embodiment of the insulation and corrosion protection system of this invention includes a segmented insulating jacket for a pipe having elongated and cross sectionally circular tubular insulation segments made of a nonmetallic construction that encircle and enclose a pipe completely to seal it from exposure to moisture. The insulation segments are made with an inner sleeve covered by an inner jacket of an elastomeric material, surrounded by a thicker layer of synthetic insulating material that is enclosed within an elastomeric outer jacket. All exposed edges and ends of each insulation segment are coated with the elastomeric sealing material to encapsulate and seal the layer of synthetic insulating material.

One object of this invention is to provide an insulating and corrosion protection system including insulation segments overcoming the aforementioned disadvantages of the prior art devices. Still, one object of this invention is to provide an insulation structure that is sealed from exposure to moisture and the environmental effects of being outdoors in order to enclose, insulate and protect the pipe upon which it is installed.

Another object of this invention is to provide a method of making the pipe insulation segments of this invention and installing them on a pipe.

Various other objects, advantages, and features of this invention will become apparent to those skilled in the art from the following discussion, taken in conjunction with the accompanying drawings, in which:

DESCRIPTION OF THE DRAWINGS

FIG. 1 is a perspective view of an insulation segment positioned on a manufacturing mandrel with portions of each layer thereof exposed for view;

FIG. 2 is a transversely taken cross sectional view of the insulation segment with the halves thereof in a full open position;

FIG. 3 is a perspective view of an insulation segment with the halves thereof positioned in a fully open position; and FIG. 4 is a perspective view of an insulation segment positioned around a pipe and secured by a plurality of bands.

The following is a discussion and description of preferred specific embodiments of the insulation and corrosion protection system for pipes of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Referring to FIG. 1 of the drawings, such shows an insulation segment 10 with portions removed to illustrate its contents and illustrate steps involved in its manufacture. The insulation and corrosion protection system of this invention uses elongated cylindrical tubular units of the insulation segments 10 to cover a pipe by joining the units together to form a continuous cover for an exposed pipe. Insulation segment 10 includes an inner sleeve 14 at the innermost portion of the segment. An inner jacket 16 of an elastomeric material surrounds and encloses inner sleeve 14. Insulating material 18 is formed in a thicker layer around the exterior of inner jacket 16. An outer jacket 20 of elastomeric material surrounds the exterior of the insulating material 18 and forms the outer weather resistant covering of the insulation segment 10.

In manufacture of insulation segment 10, it is formed on a mandrel 22 with inner sleeve 14 being formed directly on the mandrel. Inner sleeve 14 is formed from a thin sheet of metallic material or scrim that is spirally wound around the mandrel to closely conform thereto and extend the length of the segment to be made. Inner sleeve 14 is temporarily secured to a mandrel for holding it in place prior to application of inner jacket 16.

Inner jacket 16 is a layer of elastomeric material that is sprayed or otherwise coated on the exterior of inner sleeve 14 to completely enclose the exposed surface thereof and provide the inner most seal surface of the insulation segment.

Next, the insulating material layer 18 is applied to the exterior of inner jacket 16. As mandrel 22 is rotated the insulating material is sprayed onto the exterior of inner jacket 16. This material is preferably a liquid material that when aerated or sprayed expands or foams to form the insulating blanket. The foam may be a synthetic insulating material of either the open cell or closed cell type depending on the desire of the user. This material may be applied in one or more layers depending upon the characteristics of the specific material used and thickness of the insulation layer that is desired.

Next, in the manufacturing process, the insulation segment is cut longitudinally along one side thereof through insulating material 18, inner jacket 16 and inner sleeve 14. An elongated hinge 26, in the form of a thin elongated flexible metal member is positioned along and over cut line 24 on the exterior of insulating material 18. Hinge 26 extends over the exterior surface of insulating material layer 18 for a substantial distance beyond each side of cut line 24, as illustrated. Cutting through the insulation segment forms a pair of facing longitudinal surfaces 28 and 30 on opposite sides of the semi-cylindrical portions of insulation segment 10. These surfaces can be clearly seen in FIG. 2 where hingedly connected longitudinal semi-cylindrical portions of the insulation segment are shown in an opened side-by-side position.

When the insulating material layer 18 is in place, outer jacket 20 is applied to the exterior of insulating material 18. Outer jacket 20 is also an elastomeric material that is sprayed or otherwise coated onto the exterior of insulating material 18 as mandrel 22 rotates to form a substantially evenly distributed outer coating. The thickness of outer jacket 20 can be varied depending upon the specific elastomeric material used and thickness of the outer coating required for the particular use of the insulation segment. Between each of the above-mentioned steps in the manufacturing process, suitable time is allowed for curing of the materials so they will properly set to an operably functional state and bond to one another thereby forming an integrally connected unitary structure.

Next in the manufacturing process, the insulation segment is removed from mandrel 22 by making another longitudinal cut through all layers of the material to mandrel 22. The second cut is positioned on the opposite side of mandrel 22 from the first described cut 24 in order the separate the segment into a pair of semi-cylindrical portions is illustrated in FIGS. 2 and 3. The second cut forms an opening seam with a pair on longitudinal facing surfaces 32 and 34 on portions on the insulation segment that are opposite to hinge 26. In order to completely seal the exterior surface of insulation segment 10 both ends of each semi-cylindrical portion and facing surfaces 28, 30, 32, and 34 are each coated with an elastomeric material of the same character as that forming inner jacket 16 and outer jacket 18 in order to completely encapsulate each semi-cylindrical segment of insulating material 18. FIG. 2 shows the insulation segment in cross section where individual layers of the various materials are clearly visible including the elastomeric coatings of longitudinal facing surfaces 28, 30, 34, and 32.

The ends of each insulation segment each have an end surface extending transverse to the longitudinal axis of the insulation segment and having a tapered surface around the outer periphery thereof joining outer jacket 20. Tapered end surface 38 is inclined from end surface 36 toward the opposite end of the insulation segment. The tapered surface is provided so that a filler and bonding compound can be used to join the separate insulation segments. End surface 36 and tapered end surface 38 are each coated with the same elastomeric material as the other exposed surfaces of insulation segment 10.

Installation of the insulation system of this invention on a pipe is accomplished by mounting a plurality of the insulation segments on a pipe and joining them in an end-to-end manner, with each segment individually mounted on the pipe and sealed to the adjacent segment. The plurality of segments have their ends sealed to one another to environmentally isolate and weather protect the pipe.

In the installation process the pipe is first cleaned, if necessary, to remove foreign matter such as dirt, scale and corrosion. Also, if desired, water barriers may be formed on the exterior of the pipe by applying a sealing or caulking compound in bands spaced apart at intervals along pipe. Preferably the water barriers are spaced so they would not be located at the end joint of insulation segments for use in assembly. The water barriers are formed of an elastomeric sealing material that is built up in a band transversely encircling the pipe so the exterior thereof will contact the interior side of inner sleeve 14 sealing with insulation segment 10 and preventing water from moving along the pipe through the interior of insulation system.

To install an insulation segment 10 on a pipe, it is opened to the position shown in FIGS. 2 and 3 and an elastomeric sealing material is applied to longitudinal surfaces 28, 30, 32, and 34. The insulation segment is then closed around the pipe with the sealing material brought together on the several surfaces to join and seal the hingedly connected portions together as illustrated in FIG. 4. Because this material takes some time to cure to its full strength, a plurality of bands 40 are wrapped around the exterior of insulation 10 to secure the separate portions together. Bands 40 can be removed once the sealing material has cured and holding support is no longer needed. Once the bands are removed, the sealing material can be used to cover the exposed seam 42 between two halves of insulation segment 10 as shown in FIG. 4.

As a final installation step in the process, adjacent ends of the insulation segments can be sealed together by filling the groove formed by adjacent tapered end surfaces 38 on each segment thereby sealing all exposed joints between the insulation segments. Sealing this joint between ends of adjacent segments can provide a substantially smooth outer surface on the insulation system to aid in repelling water and preventing damage due to the accumulation of ice.

As can be seen from the forgoing description of the applicant's invention an insulation system is provided to environmentally isolate a pipe from exposure to a surrounding environment. The invention can be used on exposed pipes such as are used in refineries, chemical process plants and other outdoor installations requiring pipes that must be protected. Also, the invention can be used on selected segments of cross-country pipelines where insulation and corrosion protection are required.

The method of manufacturing the insulation segments is designed to build the insulation segments for the particular size of pipe required. Although the invention is shown with a straight segment of pipe, it is obvious that such can be adapted to curved shapes such as angles, elbows, and tees by application on the same basic techniques to these shapes.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

The embodiments of the invention in which an exclusive property or privilege is claimed or defined as follows.

What is claimed is:

1. A method of making a segment of pipe insulation comprising the steps of:
 (a) covering a mandrel with an inner sleeve material forming an elongated cylindrical inner support;
 (b) applying an inner jacket layer of elastomeric material to the exterior of the inner sleeve;

(c) applying a layer of insulating material to cover the inner jacket and form a thermal insulating barrier;

(d) cutting a hinge seam longitudinally through said layer of insulating material and said inner jacket and said inner sleeve;

(e) overlapping the hinge seam with a hinge element;

(f) applying an outer jacket layer of elastomeric material to the exterior and ends of the layer of insulating material and covering the hinge element;

(g) cutting an opening seam through the outer jacket, the insulating material, the inner jacket layer, and the inner sleeve at a location on the opposite side of the mandrel from the hinge seam;

(h) removing the insulation segment in two hingedly connected semi-cylindrical portions from the mandrel; and (i) applying an outer jacket layer of elastomeric material to opposed sides of the hinge seam and the opening seam and joining and sealing with the inner jacket and the outer jacket to completely encapsulate the insulating material.

2. The method of claim 1, wherein said covering a mandrel includes spirally wrapping the mandrel with a band of metallic material forming a continuous inner sleeve throughout the length of the insulation segment.

3. The method of claim 2, including the additional step of shaping ends of said insulation segment to be conically tapered on the outer portion thereof before the step of applying an outer jacket layer.

4. The method of claim 1, wherein said applying said layer of insulating material includes spraying of a liquid material that upon spraying expands to form a semi-rigid insulating material.

* * * * *